United States Patent
Yamashita

(10) Patent No.: US 7,355,321 B2
(45) Date of Patent: Apr. 8, 2008

(54) MECHANICAL QUANTITY SENSOR

(75) Inventor: Muneharu Yamashita, Toyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 314 days.

(21) Appl. No.: 10/562,363

(22) PCT Filed: May 27, 2004

(86) PCT No.: PCT/JP2004/007248

§ 371 (c)(1),
(2), (4) Date: Dec. 27, 2005

(87) PCT Pub. No.: WO2005/012920

PCT Pub. Date: Oct. 2, 2005

(65) Prior Publication Data

US 2007/0103032 A1 May 10, 2007

(30) Foreign Application Priority Data

Jul. 30, 2003 (JP) ............................. 2003-204074

(51) Int. Cl.
*H01L 41/08* (2006.01)
*G01L 7/00* (2006.01)
(52) U.S. Cl. ................. 310/316.01; 310/314; 310/317; 310/319
(58) Field of Classification Search ......... 310/314–319
See application file for complete search history.

(56) References Cited

U.S. PATENT DOCUMENTS 6,763,726 B2 * 7/2004 Yamashita .................... 73/778
7,109,636 B2 * 9/2006 Yamashita ............. 310/316.01

(Continued)

FOREIGN PATENT DOCUMENTS

DE 1296433 B 5/1969

(Continued)

OTHER PUBLICATIONS

International Search Report for PCT Application No. PCT/JP2004/007248; mailed Sep. 14, 2004; International filing date, May 27, 2004.

(Continued)

*Primary Examiner*—J. San Martin
(74) *Attorney, Agent, or Firm*—Keating & Bennett, LLP

(57) ABSTRACT

A mechanical quantity sensor includes a current-to-voltage converter/signal adder circuit that converts electric current signals flowing through two piezoelectric vibrators into voltage signals. The piezoelectric vibrators receive stresses generated by a mechanical quantity, such as acceleration, in opposite directions. A voltage amplifier/amplitude limiter circuit amplifies an added signal obtained from the two voltage signals and limits its amplitude. A phase-difference-to-voltage converter circuit detects a difference in the phases of the added signal and a feedback voltage signal applied to an acceleration detection element. A phase shifter circuit controls the phase of the feedback voltage signal so that the phase is a predetermined phase. A filter circuit minimizes frequency components higher than an oscillation frequency in an unwanted frequency band. By increasing the resistance of resistors so as to increase the damping ratio, temperature stability is increased. Accordingly, abnormal oscillation is prevented by the filter circuit, and fluctuation in the characteristics is minimized by the phase control circuit.

17 Claims, 9 Drawing Sheets

U.S. PATENT DOCUMENTS

2003/0164696 A1  9/2003  Yamashita

FOREIGN PATENT DOCUMENTS

| EP | 1 324 052 A2 | 7/2003 |
| JP | 62-050630 | 3/1987 |
| JP | 2002-243757 | 8/2002 |
| JP | 2003-254991 | 9/2003 |

OTHER PUBLICATIONS

Official communication issued in the counterpart German Application No. 11 2004 000 934.0, mailed on Aug. 8, 2007.

* cited by examiner

MECHANICAL QUANTITY SENSOR

BACKGROUND OF THE INVENTION

1. Field of the Invention

The present invention relates to a mechanical quantity sensor configured to detect a mechanical quantity such as acceleration, angular acceleration, angular velocity, or load.

2. Description of the Related Art

A known acceleration sensor including piezoelectric vibrators is disclosed in Japanese Unexamined Patent Application Publication No. 2002-243757 filed by the assignee/applicant of this application.

The known acceleration sensor outputs an acceleration detection signal in the following manner. A bridge circuit is configured with two piezoelectric vibrators receiving stresses generated by acceleration in opposite directions and two load impedances each including a capacitor. A voltage-dividing impedance circuit is provided between the average output terminals of the bridge circuit. An oscillating circuit is configured by feeding back a signal from the voltage-dividing point of the voltage-dividing impedance circuit to the connection point of the two piezoelectric vibrators by a feedback signal processing circuit. The phase difference between oscillation output terminals from the average outputs of the bridge circuit is detected as an acceleration detection signal.

Since the acceleration sensor according to Japanese Unexamined Patent Application Publication No. 2002-243757 includes a bridge circuit configured with two piezoelectric vibrators and two load impedances each including a capacitor, the phase difference between oscillation outputs does not equal zero unless the bridge is at equilibrium. In other words, even if the stresses applied to the two piezoelectric vibrators both equal zero, the output of the acceleration sensor does not equal zero. Furthermore, the known acceleration sensor has a problem in that it is difficult to control the phase shifting circuit so that acceleration sensitivity is maximized.

Since the piezoelectric vibrators and the circuits are expected to be disposed more than 10 cm apart, a detection method that does not cause problems even when the piezoelectric vibrators and the circuits are disposed more than 10 cm apart has been urgently needed.

The assignee/applicant of this application has disclosed in Japanese Unexamined Patent Application Publication No. 2003-254991 a mechanical quantity sensor that has solved the above-identified problem. The mechanical quantity sensor includes two piezoelectric vibrators receiving stresses generated by acceleration in opposite directions, a voltage signal applying circuit configured to apply a common voltage signal to the two piezoelectric vibrators, an electric current-to-voltage converter circuit configured to convert the current signals flowing through the piezoelectric vibrators into voltage signals, and a phase difference signal processor circuit configured to detect the phase difference between output signals from the electric current-voltage converter circuit and to output a mechanical quantity signal.

The mechanical quantity sensor according to Japanese Unexamined Patent Application Publication No. 2003-254991 is described with reference to FIG. 9.

In FIG. 9, an acceleration detection element 10 includes two piezoelectric vibrators Sa and Sb receiving stresses generated by acceleration applied in opposite directions. The piezoelectric vibrators Sa and Sb are connected in series to resistors RLa and RLb, respectively. A current-to-voltage converter/signal adder circuit 11 converts the current signals flowing through the piezoelectric vibrators Sa and Sb of the acceleration detection element 10 into voltage signals so as to output an Sa signal and an Sb signal, respectively. Furthermore, the current-to-voltage converter/signal adder circuit 11 outputs an added signal obtained by adding the Sa and Sb signals.

A voltage amplifier/amplitude limiter circuit 12 amplifies the voltage of the added signal, limits the amplitude, and outputs a voltage signal Vosc to the acceleration detection element 10. The voltage signal Vosc is applied to a common connecting point of the piezoelectric vibrators Sa and Sb.

A phase-difference-to-voltage converter circuit 13 generates a voltage signal that is proportional to the phase difference between the Sa and Sb signals converted into voltage signals.

An amplifier/filter circuit 14 amplifies the voltage signal converted by the phase-difference-to-voltage converter circuit 13 by a predetermined gain, eliminates unwanted frequency band components, and outputs the obtained signal as an acceleration detection signal.

In the circuit shown in FIG. 9, the resonant frequencies of the piezoelectric vibrators Sa and Sb are made equal so that the frequency Vosc is a resonant frequency fr(0) for both of the piezoelectric vibrators Sa and Sb. In this way, when stresses having reversed phases, such as compression (pulling) and pulling (compression), are applied to the piezoelectric vibrators Sa and Sb, respectively, an output signal can be obtained from the amplifier/filter circuit 14.

The $V_{osc}$ is a feedback voltage signal of a self-excited oscillator circuit configured of a loop of the piezoelectric vibrators Sa and Sb, the current-to-voltage converter/signal adder circuit 11, and the voltage amplifier/amplitude limiter circuit 12.

As illustrated in FIG. 9, resistors RLa and RLb are connected in series to piezoelectric vibrators Sa and Sb, respectively. Therefore, the damping ratio increases, and, thus, the change rate of acceleration detection sensitivity can be reduced in a wide temperature range. As a result, the sensor can be stabilized with respect to environmental temperature.

FIG. 10A shows the relationship between the magnitude of a resistor connected to the piezoelectric vibrators and the change rate of the temperature characteristics of the acceleration detection sensitivity (G sensitivity). The value of the damping ratio represented by the horizontal axis is obtained as 'damping ratio=RL/resistance at resonance,' where RLa=RLb=RL, when the resonance of the piezoelectric vibrators at resonant frequency is defined as the resonant resistance. The vertical axis represents the change rate range ((maximum value)−(minimum value)) of the acceleration detection sensitivity for the entire operational temperature range (−40° C. to +85° C.). As the damping ratio is increased, the change rate range of the acceleration detection sensitivity decreases and stabilizes with respect to temperature change.

According to an experiment carried out by the inventor, the sensor operated normally when the damping ratio was 2. However, when the damping ratio was increased to 6, abnormal oscillation was observed and the sensor was incapable of normally operating as a mechanical quantity sensor. The abnormal oscillation was caused by a decrease in response at a predetermined oscillation frequency due to an increase in the damping ratio, reducing the difference to the response at an unwanted oscillation frequency.

FIGS. 10B and 10C show the frequency characteristics of the open loop gain of a self-exciting oscillating circuit including the acceleration detection element 10, the currentto-voltage converter/signal adder circuit 11, and the voltage amplifier/amplitude limiter circuit 12, shown in FIG. 9, where the damping ratio is 2 and 6, respectively. Here, 'S' represents the response at a predetermined oscillation frequency and 'N' represents the response at an unwanted oscillating frequency band higher than the frequency N with a high gain. In general, to prevent abnormal oscillation, the difference between the gain Gs of the response S at the predetermined oscillation frequency and the maximum gain Gn of the response N at the unwanted frequency band must be 10 dB or more. In this known example, when the damping ratio was 2, the difference was 11.5 dB, which did not cause abnormal oscillation. However, when the damping ratio was 6, the difference is 6.3 dB, which caused abnormal oscillation.

The above-described problem is not limited to a sensor for detecting acceleration but is a problem that is common to sensors in which electric currents flow through piezoelectric vibrators in accordance with a mechanical quantity, such as angular acceleration, angular velocity, or load.

To minimize the signal intensity in the unwanted frequency band, a frequency filter may be provided in the oscillation loop of the self-exciting oscillating circuit. However, since a frequency filter has phase characteristics, the rate change of the phase (slope of the phase) with respect to a frequency change of a feedback signal is steep. Moreover, since there is a fluctuation in the phase characteristics of the frequency filter, if only the frequency filter is provided, the effect of the fluctuation of the phase characteristics of the frequency filter will be great, causing a new problem in that fluctuation and temperature change rate of the detection sensitivity will be increased.

SUMMARY OF THE INVENTION

In order to overcome the problems described above, preferred embodiments of the present invention provide a mechanical quantity sensor that is capable of solving the problem of abnormal oscillation and obtaining stable detection sensitivity for a mechanical quantity in a wide temperature range.

According to a preferred embodiment of the present invention, a mechanical quantity sensor includes two piezoelectric vibrators configured to receive stresses caused by a mechanical quantity in opposite directions, a voltage signal applying circuit configured to apply a voltage signal to both of the piezoelectric vibrators, a current-to-voltage converter circuit configured to convert electric current signals flowing through the piezoelectric vibrators into voltage signals, and a phase difference signal processing circuit configured to detect the phase difference between the output signals from the current-to-voltage converter circuit and output a mechanical quantity detection signal, wherein resistors are inserted in electric current paths of the piezoelectric vibrators. Furthermore, the voltage signal applying circuit includes a voltage amplifier circuit configured to amplify the voltage of an added signal corresponding to an added value of currents flowing through the piezoelectric vibrators, an amplitude limiter circuit configured to limit the amplitude of the voltage signal output from the voltage amplifier circuit to a predetermined value, a phase control circuit configured to detect the phase difference between a feedback voltage signal applied to both the piezoelectric vibrators and the added signal and control the phase of the feedback voltage signal so that the phase difference equals a predetermined value, and a filter circuit configured to minimize unwanted frequency components of the feedback voltage signal, and wherein the mechanical quantity sensor is oscillated by the piezoelectric vibrators, the voltage amplifier circuit, the amplitude limiter circuit, the phase control circuit, and the filter circuit.

According to this unique structure, unwanted frequency components of the feedback voltage signal for the piezoelectric vibrators are minimized by the filter circuit and the phase of the feedback voltage signal is controlled so that the phase difference of the feedback signal to the piezoelectric vibrators and the added signal corresponding to an added value of electric currents flowing through the piezoelectric vibrators equals a predetermined value. Therefore, the slope of the phase is prevented from becoming steep due to the filter circuit. In this way, the fluctuation and the temperature change rate is reduced.

According to another preferred embodiment of the present invention, the filter circuit is a low-pass filter having a pass band including an oscillation frequency, and the phase control circuit includes a phase-difference-to-voltage converter circuit configured to convert the phase difference between the added signal and the feedback voltage signal into a voltage signal, a comparator circuit configured to compare an output signal from the phase-difference-to-voltage converter circuit and a reference signal, and an all-pass filter including a voltage controlled resistance circuit whose impedance is changed in accordance with an output voltage from the comparator circuit, wherein the phase of the all-pass filter is changed in accordance with the impedance of the voltage controlled resistance circuit.

In this way, by providing an all-pass filter at the phase control circuit, converting the phase difference of the added signal and the feedback voltage signal into a voltage signal, and controlling the phase of the all-pass filter in accordance with the result of comparing the voltage signal and a reference signal, stable oscillation can be maintained by controlling the phase while maintaining the gain at a constant value.

According to another preferred embodiment of the present invention, the phase control circuit is configured to control the phase difference between the feedback voltage signal and the added signal so that detection sensitivity of a mechanical quantity is maximized.

In this way, the detection sensitivity of the mechanical quantity is maximized.

In preferred embodiments of the present invention, the mechanical quantity is, for example, acceleration, angular acceleration, angular velocity, or load.

According to another preferred embodiment of the present invention, the damping ratio is increased by connecting the resistors to the piezoelectric vibrators receiving stresses generated by a mechanical quantity in opposite directions. In this way, the range of the change rate of the acceleration detection sensitivity decreases, stabilizing the sensor with respect to temperature change. Moreover, the phase difference of the feedback voltage signal applied to both of the piezoelectric vibrators and the added signal of the currents flowing through the piezoelectric vibrators are maintained at predetermined values and unwanted frequency components of the feedback voltage signal are minimized. Consequently, the slope of the phase is prevented from becoming steep due to providing the filter circuit, and the fluctuation of the detection sensitivity and the temperature change rate is reduced. Moreover, by controlling the phase, the phase of the feedback voltage signal with respect to the acceleration detection element is stabilized, the oscillation is stabilized, and the noise components included in the mechanical quantity detection signal is minimized. Accordingly, for example, the time constant of the low-pass filter for minimizing the noise components can be a small value, and, thus, the response can be improved.

According to another preferred embodiment of the present invention, the filter circuit configured to minimize unwanted frequency components of the feedback voltage signal is a low-pass filter including the oscillation frequency in its passing band and an all-pass filter is provided at the phase control circuit configured to maintain the phase difference of the feedback voltage signal applied to both of the piezoelectric vibrators and the added signal of the current flowing through the two piezoelectric vibrators at a predetermined value. In this way, the phase can be controlled while the gain is maintained constant. Thus, stable oscillation can be maintained.

According to another preferred embodiment of the present invention, due to the phase control circuit, the phase difference between the feedback voltage signal and the added signal is controlled so that the detection sensitivity of the mechanical quantity is maximized. Therefore, a mechanical quantity can always be detected at maximum sensitivity.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 8A:
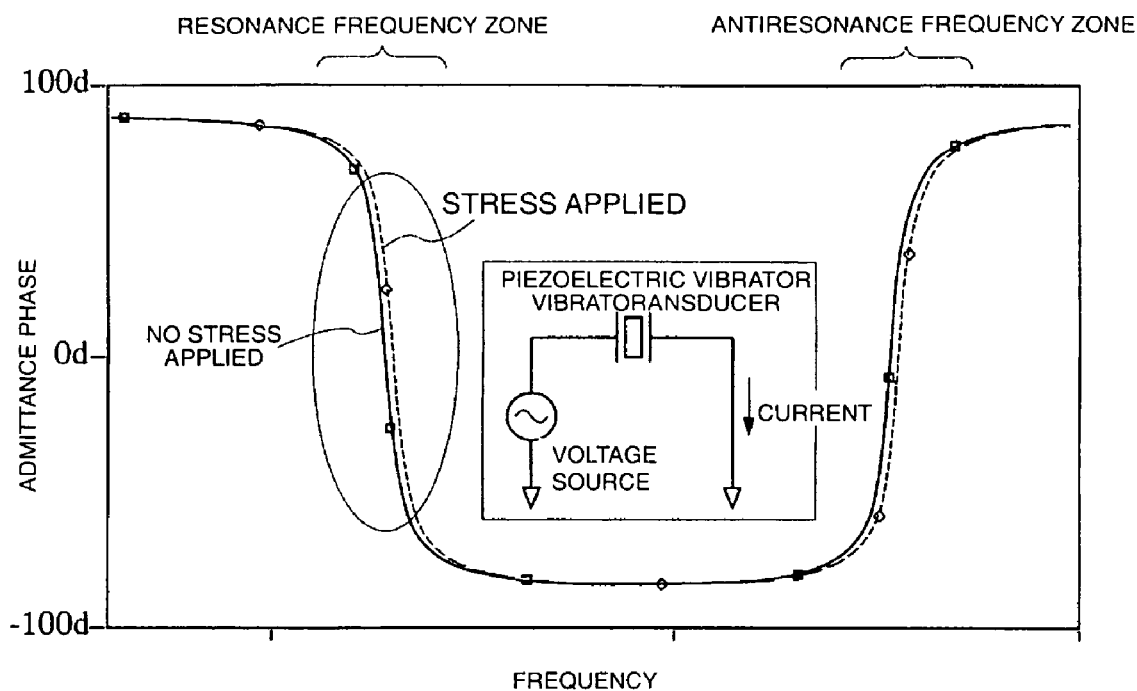
FIGS. 8A and 8B illustrate the characteristics of a piezoelectric vibrator included in an acceleration sensor.
Figure 8B:
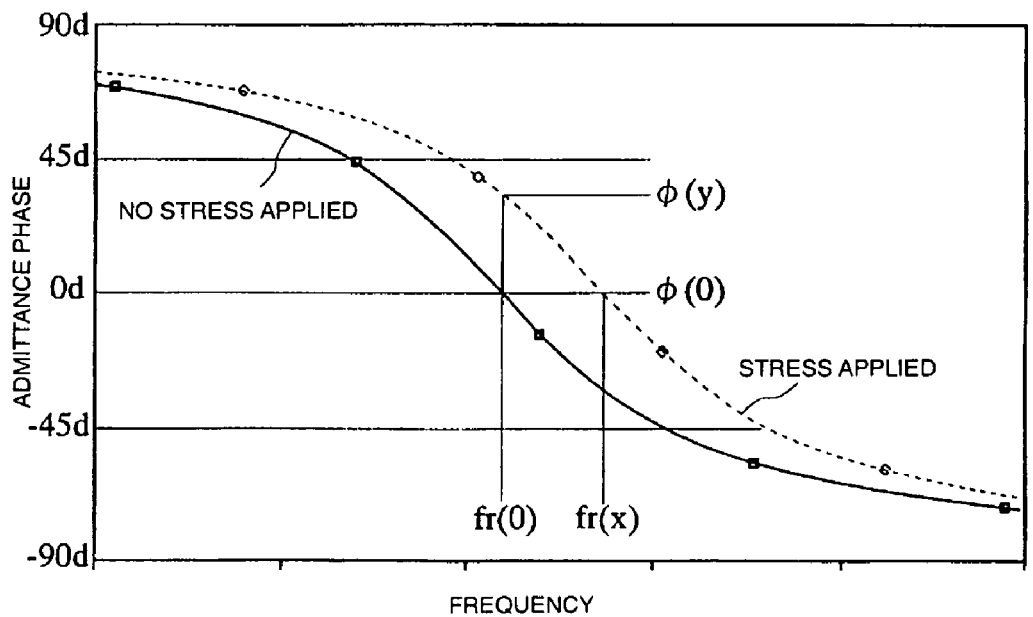
Figure 9:
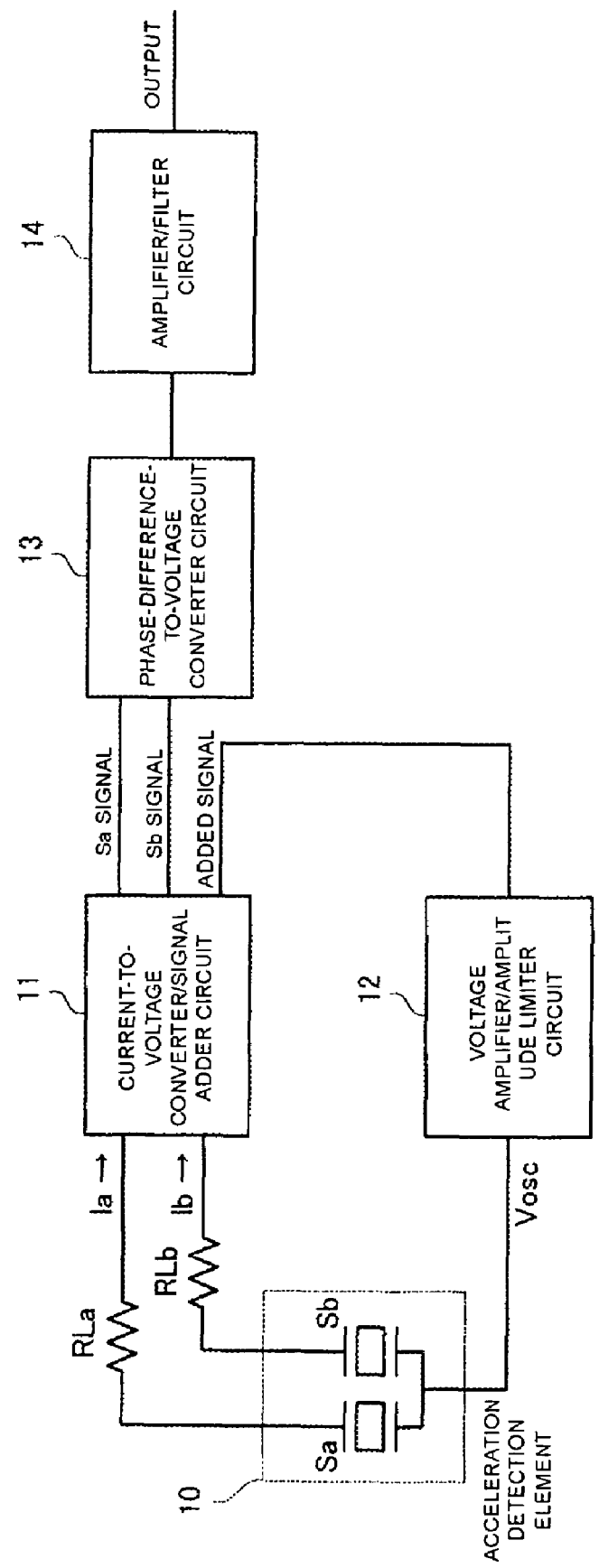
FIG. 9 is a block diagram illustrating the overall structure of a known acceleration sensor.

First, the characteristics of a piezoelectric vibrator included in an acceleration sensor according to a preferred embodiment of the present invention will be described with reference to FIGS. 8A and 8B. FIG. 8A shows a change in the phase of an electric current (i.e., admittance phase) corresponding to a change in the frequency of a voltage source of the circuit shown in the drawing. The solid line represents a state in which stress is not applied, whereas the dotted line represents a state in which stress is applied. FIG. 8B is an enlarged view of the resonant frequency band shown in FIG. 8A.

In FIGS. 8A and 8B, the frequencies having a phase of zero degrees are the resonant frequencies of a piezoelectric vibrator. As apparent from FIGS. 8A and 8B, the resonant frequency changes from fr(0) to fr(x) when stress is applied. If the frequency of the voltage source is fixed at fr(0), the phase changes from $\phi(0)$ to $\phi(y)$ when stress is applied.

The structure of an acceleration sensor according to the first preferred embodiment of the present invention will be described with reference to FIGS. 1 to 6B.

Figure 1:
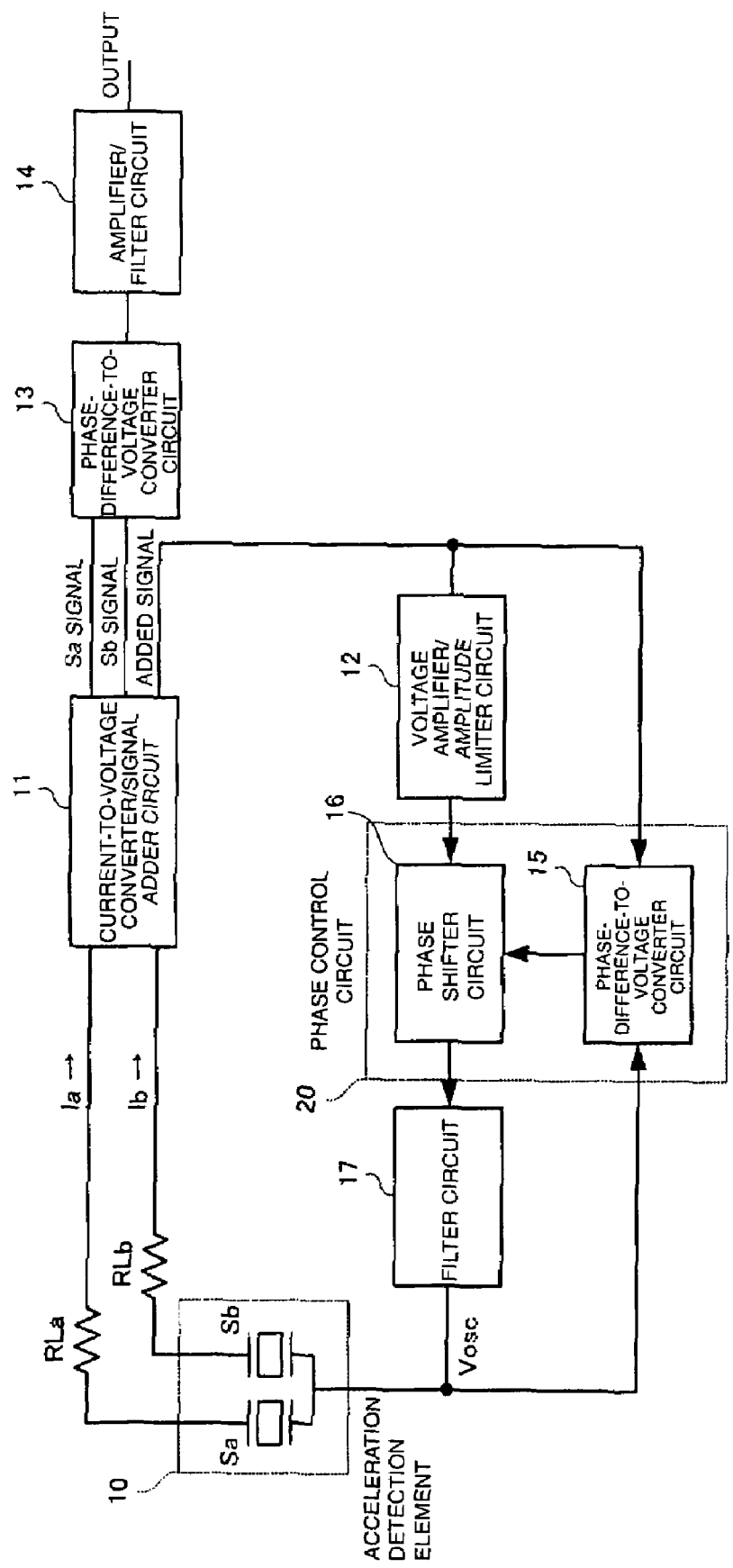
FIG. 1 is a block diagram illustrating the overall structure of an acceleration sensor according to a first preferred embodiment of the present invention.

FIG. 1 is a block diagram illustrating the overall structure of the acceleration sensor. An acceleration detection element 10 includes piezoelectric vibrators Sa and Sb receiving stresses generated by acceleration applied in opposite directions. A current-to-voltage converter/signal adder circuit 11 converts the current signals flowing through the piezoelectric vibrators Sa and Sb of the acceleration detection element 10 into voltage signals and outputs Sa and Sb signals. The current-to-voltage converter/signal adder circuit 11 also outputs an added signal obtained by adding the Sa and Sb signals.

A voltage amplifier/amplitude limiter circuit 12 amplifies the voltage of the added signal and limits its amplitude.

A phase control circuit 20 controls the phase of the output signal from the voltage amplifier/amplitude limiter circuit 12. A filter circuit 17 attenuates output signals from the phase control circuit 20 that have frequencies higher than a predetermined cutoff frequency.

The output signal $V_{osc}$ from the filter circuit 17 is fed back to the acceleration detection element 10. More specifically, a loop including the piezoelectric vibrators Sa and Sb, the current-to-voltage converter/signal adder circuit 11, the voltage amplifier/amplitude limiter circuit 12, the phase control circuit 20, and the filter circuit 17 configure a self-exciting oscillating circuit. The feedback voltage signal $V_{osc}$ is applied to the common connecting point of the piezoelectric vibrators Sa and Sb.

The phase control circuit 20 includes a phase-difference-to-voltage converter circuit 15 and a phase shifter circuit 16. The phase-difference-to-voltage converter circuit 15 generates a voltage signal corresponding to the phase difference between the added signal from the current-to-voltage converter/signal adder circuit 11 and the feedback voltage signal $V_{osc}$, which is an output signal from the filter circuit 17. The phase shifter circuit 16 shifts the phase of the output signal from the voltage amplifier/amplitude limiter circuit 12 by an amount corresponding to the voltage signal output from the phase-difference-to-voltage converter circuit 15.

Figure 10A:
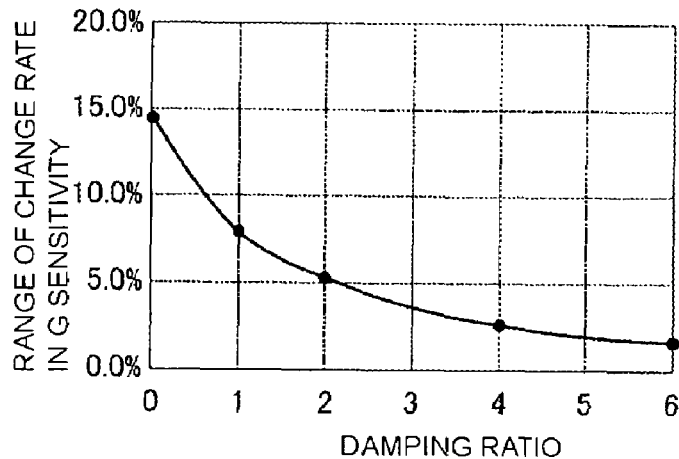
FIGS. 10A to 10C illustrate a damping ratio and the range of the change rate of acceleration detection sensitivity with respect to temperature change, and the frequency characteristics of an open loop gain of a self-excited oscillating circuit.
Figure 10B:
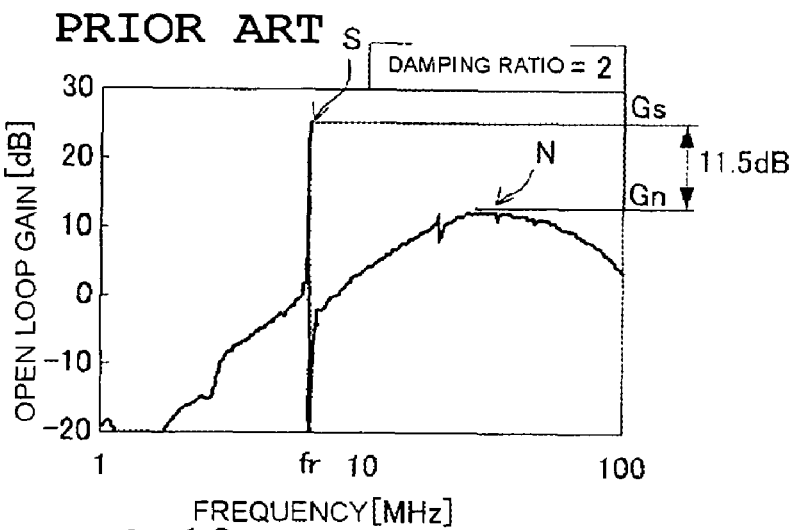

The filter circuit 17 minimizes the frequency components in the unwanted frequency band, as shown in FIG. 10B, by attenuating frequencies higher than a cutoff frequency in the vicinity of a predetermined oscillation frequency (a resonant frequency fr of the piezoelectric vibrator). As a result, the maximum gain Gn in the unwanted frequency band, shown in FIG. 10B, is decreased so that the difference between gains Gs and Gn at the predetermined resonant frequency fr increases.

Although the filter circuit 17 causes the phases of input and output signals to be different from each other, the phases of an added signal corresponding to the added current value of the piezoelectric vibrators Sa and Sb and the feedback voltage signal $V_{osc}$ applied to both of the piezoelectric vibrators Sa and Sb are controlled by the phase control circuit 20 so that the phase difference is constantly maintained at a predetermined value. In this way, the phase change due to the filter circuit 17 is cancelled out. As a result, the self-exciting oscillating circuit can be stably oscillated even when the values of resistors RLa and RLb are increased to increase the damping ratio.

The phase-difference-to-voltage converter circuit 13 corresponds to the "phase difference signal processing circuit" according to various preferred embodiments of the present invention and generates a voltage signal proportional to the phase difference between the signal Sa and the signal Sb, which are voltage signals obtained by converting the current signals.

The amplifier/filter circuit 14 amplifies the voltage signal obtained by the phase-difference-to-voltage converter circuit 13 by a predetermined gain, eliminates unwanted frequency band components, and outputs an acceleration detection signal.

In the circuit shown in FIG. 1, the resonant frequencies of the piezoelectric vibrators Sa and Sb are made equal so that the frequency VOSC is set as the resonant frequency fr(0) for both of the piezoelectric vibrators Sa and Sb. In this way, when stresses having reversed phases are applied to the piezoelectric vibrators Sa and Sb, an output signal substantially proportional to the applied stresses can be output from the amplifier/filter circuit 14.

The frequency $V_{osc}$ is not limited to the resonant frequency for the piezoelectric vibrators Sa and Sb, and so long as the frequency $V_{osc}$ is set to a frequency that has frequency-to-phase characteristics represented by a substantially straight line, as shown in FIGS. 8A and 8B, the acceleration signal can be detected. The maximum acceleration detection sensitivity is obtained when the frequency $V_{osc}$ equals the resonant frequency of the piezoelectric vibrators Sa and Sb. However, for practical use, the frequency may be set so that the admittance phase is within about +45 degrees.

Even when the resonant frequencies of the piezoelectric vibrators Sa and Sb are not the same, the sensitivity will be suitable for practical use so long as the frequency $V_{osc}$ is set so the admittance phases of the piezoelectric vibrators Sa and Sb are within about ±45 degrees. More preferably, the frequency $V_{osc}$ may be a value between the resonant frequency of the piezoelectric vibrator Sa and the resonant frequency of the piezoelectric vibrator Sb.

Since stresses having reversed phases, such as compression (pulling) and pulling (compression), are applied to the piezoelectric vibrators Sa and Sb, respectively, the changes in the characteristics of the piezoelectric vibrators Sa and Sb are always in reversed phases. Thus, when the signals from the piezoelectric vibrators Sa and Sb are added, they cancel out each other. Accordingly, the added signal output from the current-to-voltage converter/signal adder circuit 11 will always have the same characteristics regardless of the applied acceleration. Therefore, even when the characteristics of the piezoelectric vibrators Sa and Sb change due to the applied acceleration, the frequency $V_{osc}$ does not change.

As shown in the phase characteristics of the piezoelectric vibrator in FIGS. 8A and 8B, there are two bands (resonant frequency band and anti-resonant frequency band) in which the admittance phase is within about ±45 degrees. In the anti-resonant frequency band, since impedance of the piezoelectric vibrator is high, the electric current flowing through the current-to-voltage converter/signal adder circuit 11 is reduced. As a result, gain is reduced, and the piezoelectric vibrator does not oscillate.

On the contrary, in the resonant band, since impedance of the piezoelectric vibrator is low, the electric current flowing through the current-to-voltage converter/signal adder circuit 11 is increased. As a result, gain is increased, and the oscillation of the triangular prism 12 is more stable.

In the resonant band, the impedance of the piezoelectric vibrator and the input impedance of the current-to-voltage converter/signal adder circuit 11 are both low and can be easily matched with each other. Thus, the C/N ratio can be easily improved.

Figure 2:
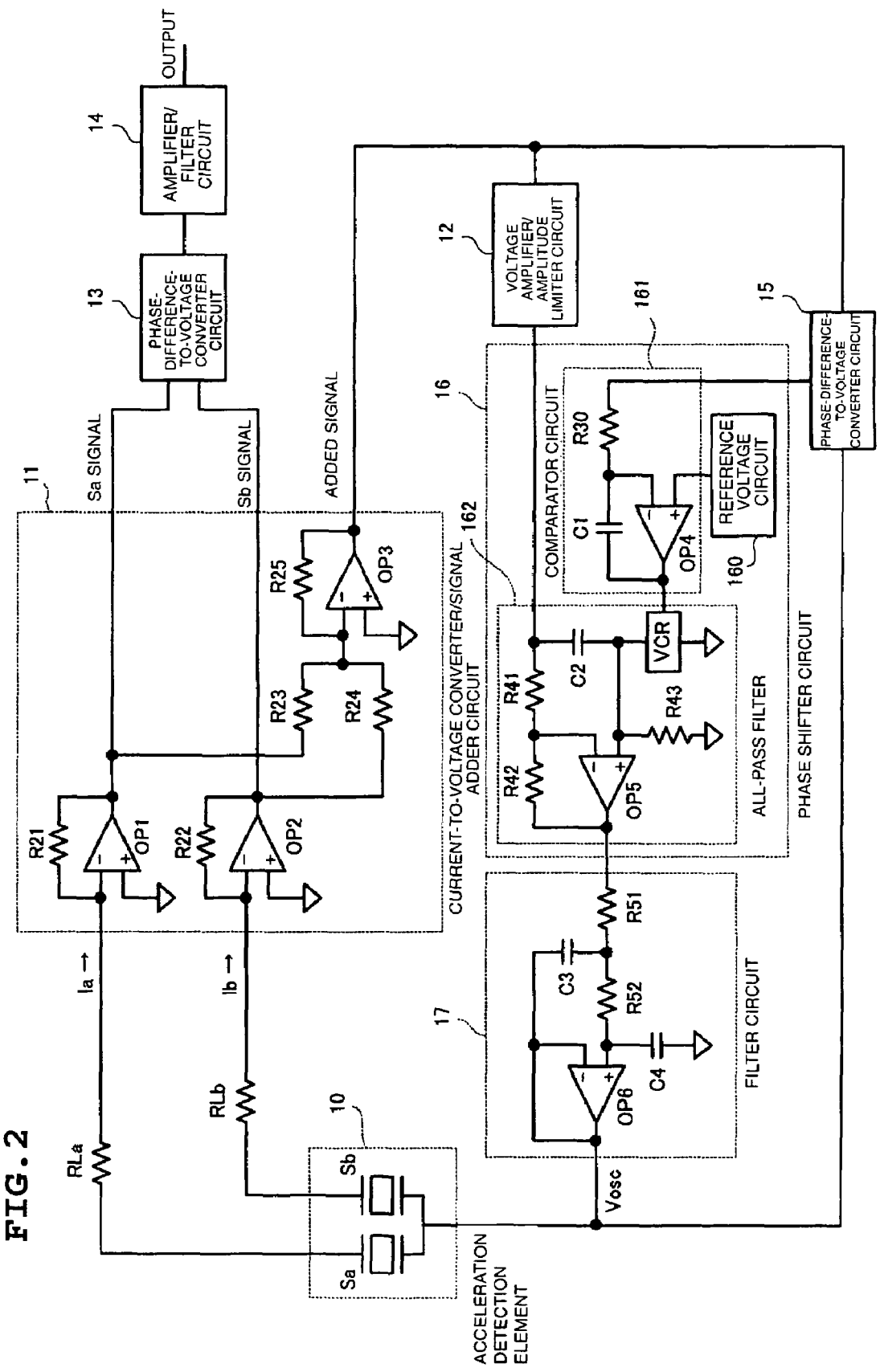
FIG. 2 is a detailed circuit diagram of the acceleration sensor.

Next, FIG. 2 shows specific, preferred circuits in the acceleration sensor shown in FIG. 1. In the current-to-voltage converter/signal adder circuit 11, a first current-to-voltage converter circuit includes an operational amplifier OP1 and a feedback resistor R21, a second current-to-voltage converter circuit includes an operational amplifier OP2 and a feedback resistor R22, and an adder circuit includes an operational amplifier OP3 and feedback resistors R23, R24, and R25.

The filter circuit 17, as shown in FIG. 2, includes an operational amplifier OP6, resistors R51 and R52, and capacitors C3 and C4 which define a secondary low-pass filter. In other words, in a frequency band higher than the cutoff frequency, the gain is attenuated by about 40 dB as the frequency is increased by about ten times.

Figure 3A:
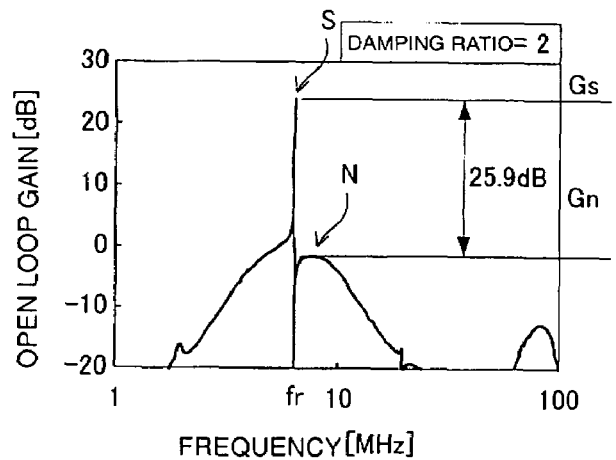
FIGS. 3A and 3B illustrate the frequency characteristics of an open loop gain of a self-exciting oscillating circuit of the acceleration sensor.
Figure 3B:
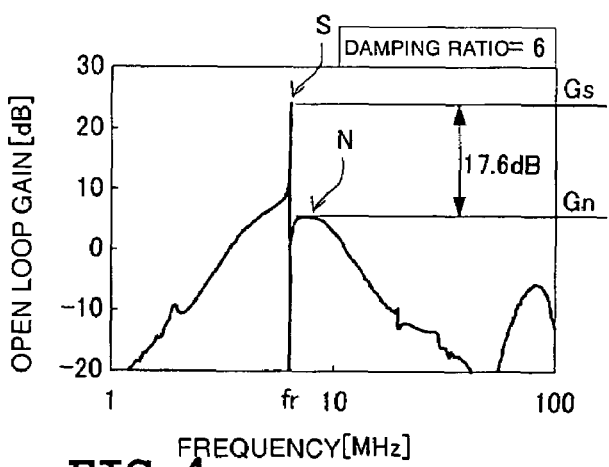
Figure 10C:
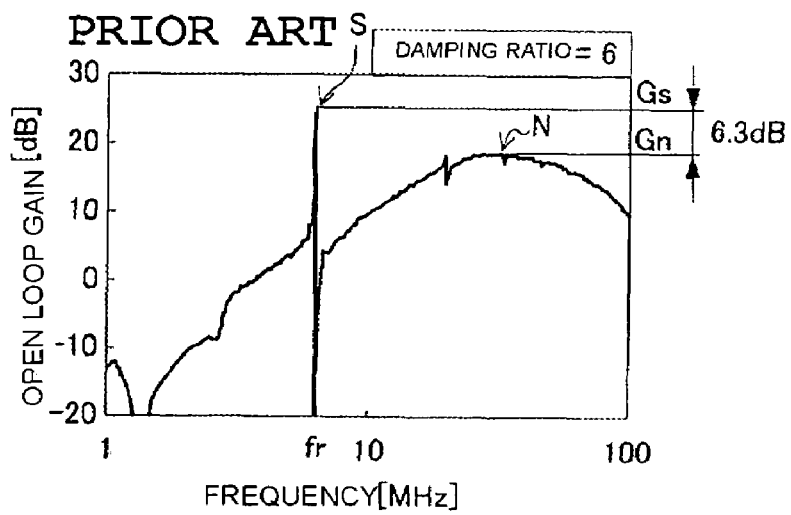

FIGS. 3A and 3B show the frequency characteristics of an open loop gain of a self-exciting circuit including the filter circuit 17 when damping ratios are 2 and 6, respectively. When the frequency characteristics shown in FIGS. 3A and 3B are compared with the characteristics shown in FIGS. 10B and 10C, it is apparent that the maximum gains Gn in the unwanted frequency bands are significantly attenuated and the differences between the maximum gains Gn and the gains Gs in the predetermined frequency bands are about 25.9 dB and about 17.6 dB, respectively. Accordingly, by increasing the values of the resistors RLa and RLb, shown in FIG. 1, abnormal oscillation can be prevented even when the damping ratio is increased. More specifically, as shown in FIG. 3B, even when the damping ratio is 6, the difference between the maximum gain Gn of the response N in the unwanted frequency band and gain Gs is about 17.6 dB. This value is about 7.6 dB higher than 10 dB that is a value known as an indication of abnormal oscillation.

In FIG. 2, the phase shifter circuit 16 includes a comparator circuit 161, a reference voltage circuit 160, and an all-pass filter 162. The comparator circuit 161 preferably includes an operational amplifier OP4, a resistor R30, and a capacitor C1. The comparator circuit 161 compares a reference voltage generated by the reference voltage circuit 160 and a voltage output by the phase-difference-to-voltage converter circuit 15 and outputs a voltage signal obtained by amplifying the voltage difference with a predetermined voltage gain.

The all-pass filter 162 includes a voltage controlled resistance circuit (VCR) whose impedance is changed in accordance with an output voltage from the comparator circuit, wherein the phase of the all-pass filter is changed in accordance with the impedance of the voltage controlled resistance circuit. As characteristics of the all-pass filter 162, the gain in all frequency bands is constant and the phase can be changed from 0 to 180 degrees.

Figure 4:
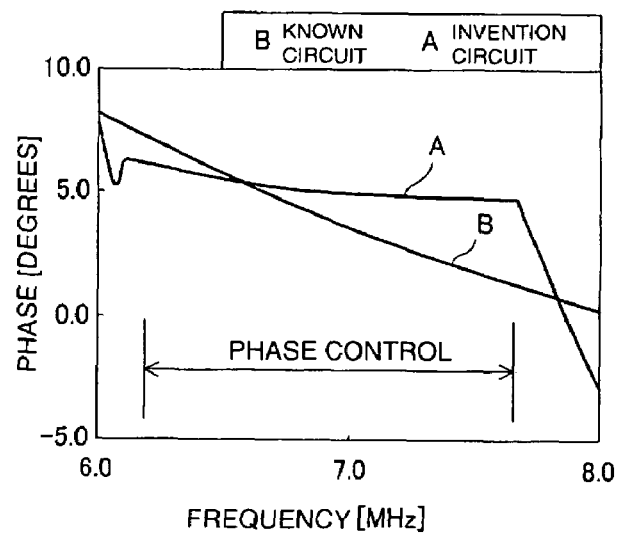
FIG. 4 illustrates the phase stability of a feedback voltage signal generated by providing a phase control circuit.

FIG. 4 shows the effect of the phase control circuit 20, shown in FIG. 1. If the characteristics of the acceleration detection element 10 are included, the phase characteristics of the entire sensor will become complex. Therefore, characteristics of the circuits not including the acceleration detection element 10 are shown here. In a known circuit not including the phase control circuit 20, the slope of the phase change with respect to slope of the frequency change is steep, as shown by the line B. However, by providing the phase control circuit 20, the slope of the phase change with respect to the slope of the frequency change is significantly reduced in the predetermined phase control frequency band, as shown by the line A.

A phase control band is determined by a predetermined frequency band centered on the oscillation frequency (resonant frequency fr of the piezoelectric vibrator). If the slope of the phase change with respect to the slope of frequency change is not steep in the phase control band, a fluctuation in the acceleration detection sensitivity can be kept small even if the resonant frequencies of the piezoelectric vibrators Sa and Sb fluctuate due to manufacturing factors. By providing the phase control circuit 20, the phase of the feedback voltage signal $V_{osc}$ applied to the two piezoelectric vibrators can be a predetermined phase. According to this preferred embodiment, the phase is six degrees. Since the phase of the self-exciting oscillating circuit is zero degrees as a total, the phase of the acceleration detection element 10 is −6 degrees. This means that the phase of the electric current flowing through the acceleration detection element 10 is −6 degrees with respect to the applied voltage. This is the point where the slope of the current phase of the acceleration detection element 10 according to this preferred embodiment becomes the straightest and the steepest. By controlling the phase so that such a point is obtained, the acceleration detection sensitivity is maximized and linearity is improved. The above-mentioned "6 degrees" of the phase is a value for this preferred embodiment and may be changed in accordance with the characteristics of the acceleration detection element 10 and/or the intended use of the sensor.

Figure 5A:
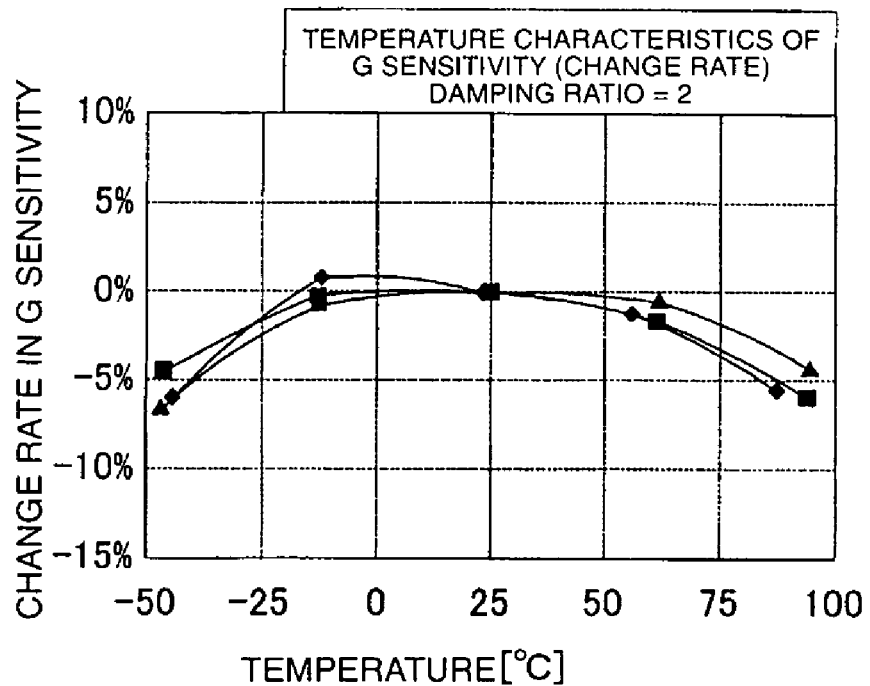
FIGS. 5A and 5B illustrate the characteristics of the change rate of acceleration detection sensitivity with respect to temperature change.
Figure 5B:
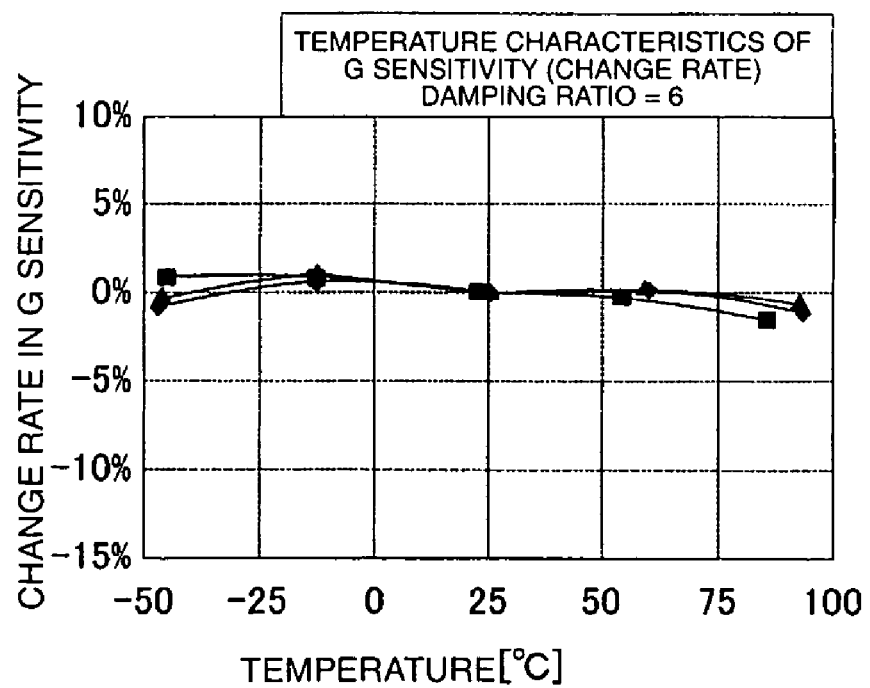

FIGS. 5A and 5B show an improvement in the change rate of the acceleration detection sensitivity corresponding to temperature change. FIG. 5A shows the change rate of the acceleration detection sensitivity corresponding to temperature change when the damping ratio is 2. FIG. 5B shows the change rate of the acceleration detection sensitivity corresponding to temperature change when the damping ratio is 6. In either case, three samples were used for measurement. In a known circuit, the sensor can not function as an acceleration sensor due to abnormal oscillation when the damping ratio is 6, whereas, according to this preferred embodiment, the sensor operates stably even when the damping ratio is 6. Moreover, according to this preferred embodiment, the range of change rate of the acceleration detection sensitivity can be maintained within about ±2% in a wide temperature range of about −40° C. to about 90° C.

Figure 6A:
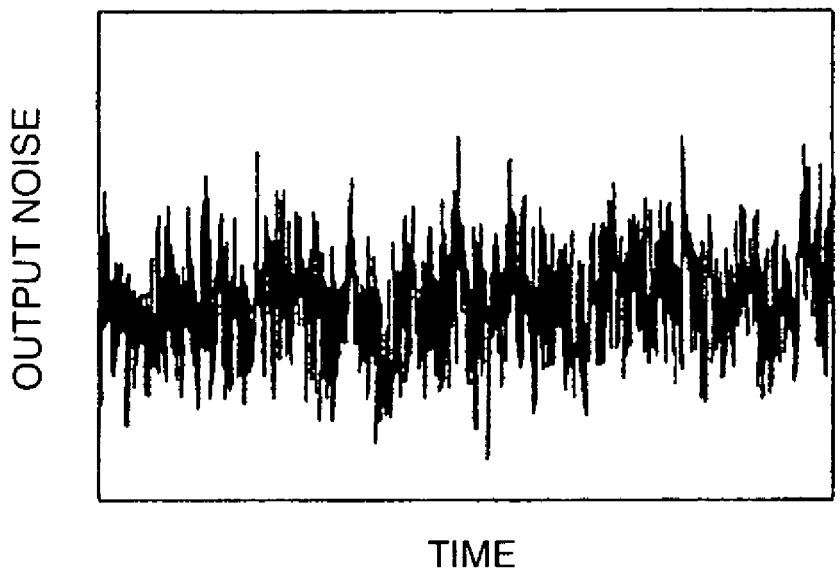
FIGS. 6A and 6B illustrate improvements in the output noise characteristics by a phase control circuit.
Figure 6B:
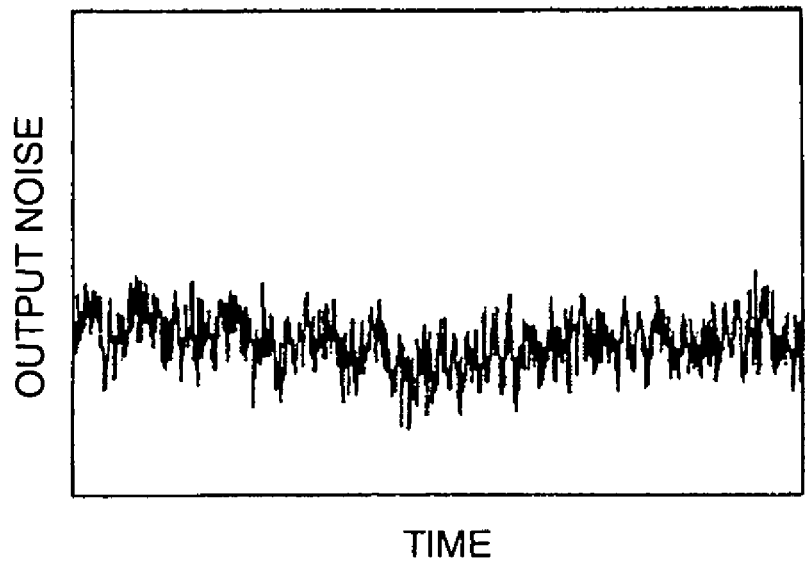

FIGS. 6A and 6B show an improvement in the output noise characteristics by the phase control circuit 20. FIG. 6A shows the noise characteristics of a known circuit, and FIG. 6B shows the noise characteristics of a circuit according to a preferred embodiment of the present invention. Here, the output noise is a noise component observed in the output of the phase-difference-to-voltage converter circuit 13, as shown in FIG. 1. In the known circuit not including the phase control circuit 20, as shown in FIG. 6A, the amplitude of a random output noise is great, whereas, in the acceleration sensor according to the present preferred embodiment, the observed output noise is reduced by about one half. This is possibly because the phase control circuit 20 stabilizes the phase of the feedback voltage signal $V_{osc}$ applied to the acceleration detection element 10, stabilizing the oscillation as a result. Since, the output noise component is reduced in this way, the time constant of the low-pass filter configured to minimize the output noise component in the amplifier/filter circuit 14 can be a small value. As a result, the response of the sensor is improved.

Next, an acceleration sensor according to a second preferred embodiment will be described with reference to FIG. 7.

The structure of the current-to-voltage converter/signal adder circuit 11 of the acceleration sensor according to the second preferred embodiment differs from that of the sensor shown in FIG. 2. The structure of the current-to-voltage converter/signal adder circuit 11 according to the second preferred embodiment adds voltages generated in resistors RLa and RLb when electric currents Ia and Ib flowing through piezoelectric vibrators Sa and Sb, respectively, of the acceleration detection element 10 flow through resistors RLa and RLb respectively. Operational amplifiers OP1 and OP2 each have significantly high input impedance and make up a voltage follower circuit having a gain of 1. An operational amplifier OP3 and resistors R25 and R26 define a non-inverting amplifier circuit. The non-inverting amplifier circuit and resistors R23 and R24 define an adder circuit that receives an added signal generated from the output voltages of the operational amplifiers OP1 and OP2.

Figure 7:
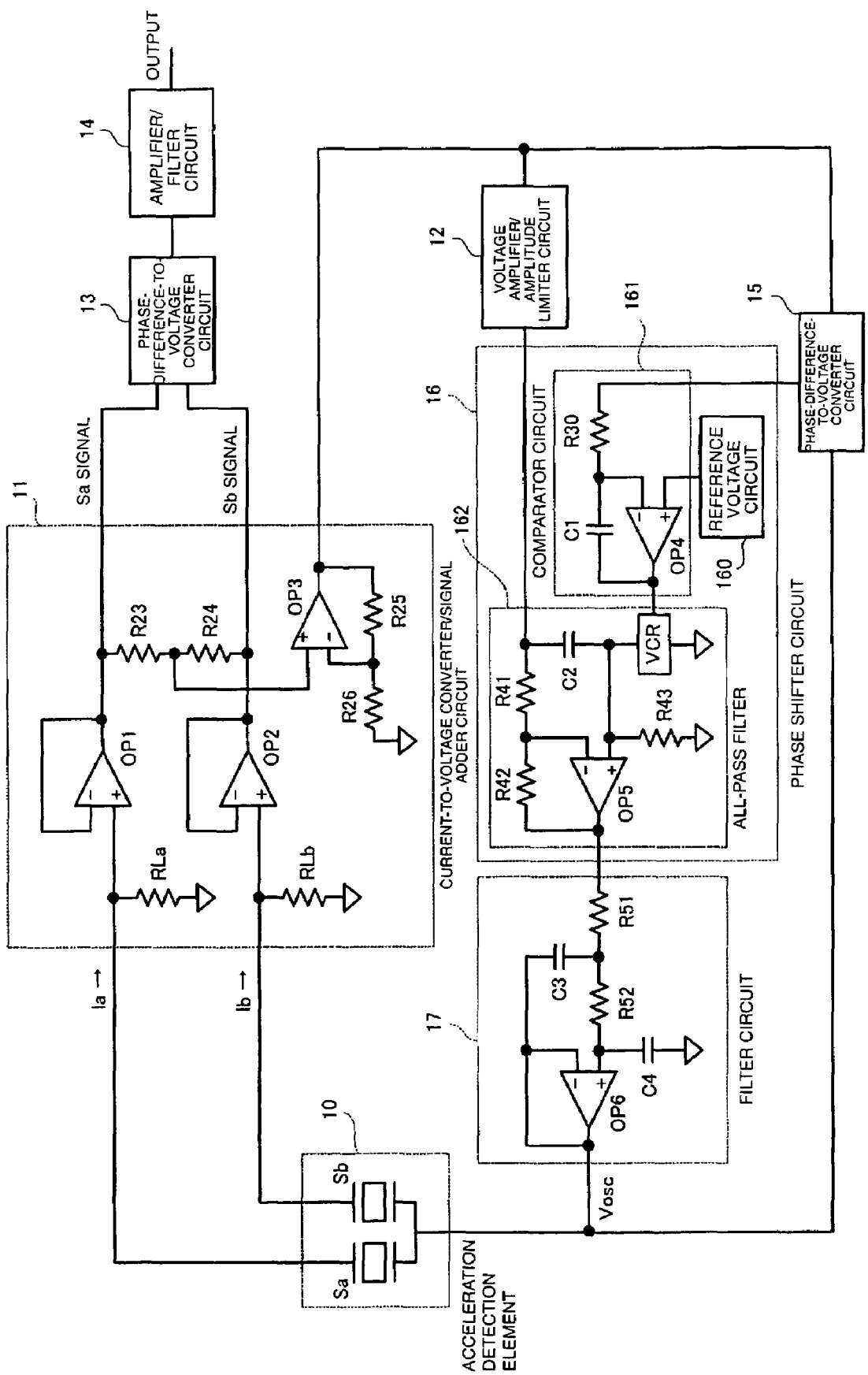
FIG. 7 is a circuit diagram illustrating the structure of an acceleration sensor according to a second preferred embodiment of the present invention.

In FIG. 2, the resistors RLa and RLb are connected in series to the acceleration detection element 10, whereas, in FIG. 7, the resistors RLa and RLb are connected between the inputs of the operational amplifier OP1 and OP2, respectively, and the ground.

The first and second preferred embodiments describe acceleration sensors configured to detect a difference in stresses applied to the piezoelectric vibrators Sa and Sb due to acceleration. A sensor for detecting other mechanical quantities can be configured by configuring the piezoelectric vibrators Sa and Sb such that stresses in opposite directions are applied to the piezoelectric vibrators Sa and Sb. For example, if a difference in stresses applied to the piezoelectric vibrators Sa and Sb is generated due to angular acceleration, the sensor can be used as an angular acceleration sensor. If a difference in stresses applied to the piezoelectric vibrators Sa and Sb is generated due to angular velocity, the sensor can be used as an angular velocity sensor. Similarly, if a difference in stresses applied to the piezoelectric vibrators Sa and Sb is generated due to load, the sensor can be used as a load sensor.

According to preferred embodiments of the present invention, a mechanical quantity, such as acceleration, angular acceleration, angular velocity, or load, of a moving object can be detected, and the condition of the object and the condition of apparatuses related to the object can be detected.

While the present invention has been described with respect to preferred embodiments thereof, it will be apparent to those skilled in the art that the disclosed invention may be modified in numerous ways and may assume many preferred embodiments other those specifically set out and described above. Accordingly, it is intended by the appended claims to cover all modifications of the present invention which fall within the true spirit and scope of the present invention.

The invention claimed is:

1. A mechanical quantity sensor comprising:
   two piezoelectric vibrators arranged to receive stresses caused by a mechanical quantity in opposite directions;
   a voltage signal applying circuit arranged to apply a voltage signal to the two piezoelectric vibrators;
   a current-to-voltage converter circuit arranged to convert electric current signals flowing through the piezoelectric vibrators into voltage signals;
   a phase difference signal processing circuit arranged to detect a phase difference between the voltage signals output from the current-to-voltage converter circuit and output a mechanical quantity detection signal; and
resistors arranged in electric current paths of the two piezoelectric vibrators; wherein
the voltage signal applying circuit includes:
  a voltage amplifier and amplitude limiter circuit arranged to amplify the voltage of an added signal corresponding to an added value of currents flowing through the two piezoelectric vibrators and to limit the amplitude of the voltage signal output from the voltage amplifier circuit to a predetermined value;
  a phase control circuit arranged to detect the phase difference between a feedback voltage signal applied to both of the two piezoelectric vibrators and the added signal and control the phase of the feedback voltage signal so that the phase difference equals a predetermined value; and
  a filter circuit arranged to minimize unwanted frequency components of the feedback voltage signal; and
wherein the mechanical quantity sensor is oscillated by the piezoelectric vibrators, the voltage amplifier circuit, the amplitude limiter circuit, the phase control circuit, and the filter circuit.

2. The mechanical quantity sensor according to claim 1, wherein the filter circuit is a low-pass filter having a passing band including the oscillation frequency.

3. The mechanical quantity sensor according to claim 1, wherein the phase control circuit includes:
  a phase-difference-to-voltage converter circuit arranged to convert the phase difference between the added signal and the feedback voltage signal into a voltage signal;
  a comparator circuit arranged to compare an output signal from the phase-difference-to-voltage converter circuit and a reference signal; and
  an all-pass filter including a voltage controlled resistance circuit whose impedance is changed in accordance with an output voltage from the comparator circuit, wherein the phase of the all-pass filter is changed in accordance with the impedance of the voltage controlled resistance circuit.

4. The mechanical quantity sensor according to claim 1, wherein the phase control circuit is arranged to control the phase difference between the feedback voltage signal and the added signal so that detection sensitivity of the mechanical quantity is maximized.

5. The mechanical quantity sensor according to claim 1, wherein the mechanical quantity is acceleration.

6. The mechanical quantity sensor according to claim 1, wherein the mechanical quantity is angular acceleration.

7. The mechanical quantity sensor according to claim 1, wherein the mechanical quantity is angular velocity.

8. The mechanical quantity sensor according to claim 1, wherein the mechanical quantity is a load.

9. A mechanical quantity sensor comprising:
two piezoelectric vibrators arranged to receive stresses caused by a mechanical quantity in opposite directions;
a circuit arranged to apply a voltage signal to both of the two piezoelectric vibrators, wherein the circuit includes:
  a voltage amplifier/amplitude limiter circuit arranged to amplify the voltage of an added signal corresponding to an added value of currents flowing through the two piezoelectric vibrators and to limit the amplitude of the voltage signal output from the voltage amplifier circuit to a predetermined value; and
  a phase control circuit arranged to detect the phase difference between a feedback voltage signal applied to both the piezoelectric vibrators and the added signal and control the phase of the feedback voltage signal so that the phase difference equals a predetermined value;
a circuit arranged to convert electric current signals flowing through the piezoelectric vibrators into voltage signals; and
a circuit arranged to detect a phase difference between the voltage signals output from the converter circuit and output a mechanical quantity detection signal.

10. The mechanical quantity sensor according to claim 9, wherein the circuit arranged to apply a voltage signal to both of the piezoelectric vibrators further includes a filter circuit configured to minimize unwanted frequency components of the feedback voltage signal.

11. The mechanical quantity sensor according to claim 10, wherein the filter circuit is a low-pass filter having a passing band including the oscillation frequency.

12. The mechanical quantity sensor according to claim 9, wherein the phase control circuit includes a phase-difference-to-voltage converter circuit arranged to convert the phase difference between the added signal and the feedback voltage signal into a voltage signal.

13. The mechanical quantity sensor according to claim 12, wherein the phase control circuit includes a comparator circuit arranged to compare an output signal from the phase-difference-to-voltage converter circuit and a reference signal.

14. The mechanical quantity sensor according to claim 13, wherein the phase control circuit includes an all-pass filter including a voltage controlled resistance circuit whose impedance is changed in accordance with an output voltage from the comparator circuit, wherein the phase of the all-pass filter is changed in accordance with the impedance of the voltage controlled resistance circuit.

15. The mechanical quantity sensor according to claim 9, wherein the mechanical quantity is one of acceleration, angular acceleration, angular velocity, and a load.

16. The mechanical quantity sensor according to claim 9, further comprising resistors connected in series to the two piezoelectric vibrators.

17. The mechanical quantity sensor according to claim 9, further comprising resistors connected between inputs of operational amplifiers in the converter circuit and ground.

* * * * *